Figure 1:
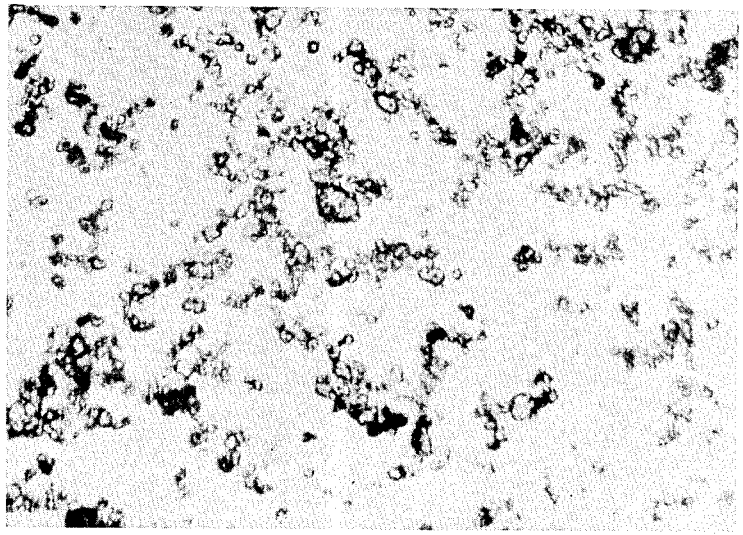

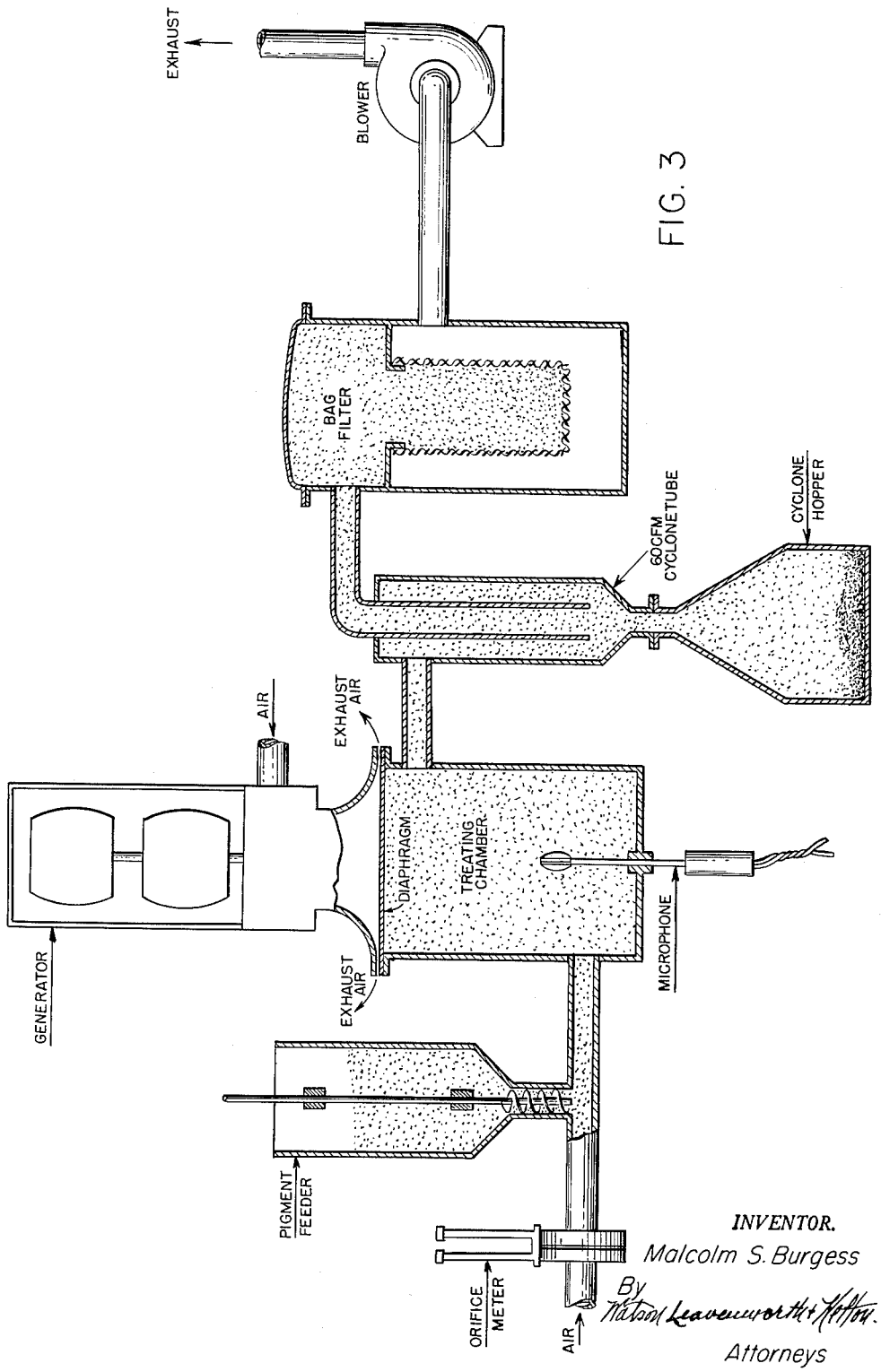

United States Patent Office 3,042,320
Patented July 3, 1962

3,042,320
TREATMENT OF MINERAL SUBSTANCES
Malcolm S. Burgess, Macon, Ga., assignor to Burgess Pigment Company, Sandersville, Ga., a company of Georgia
Filed Apr. 22, 1958, Ser. No. 730,164
3 Claims. (Cl. 241—26)

The invention relates to a method for the treatment of mineral substances and to the products resulting therefrom. More particularly, it pertains to a method for the treatment of a clay and the product thus obtained, and includes correlated improvements and discoveries whereby a material of enhanced properties is produced. It is to be understood that the expression "mineral substances" refers to inorganic materials in solid form.

An object of the invention is to provide a method for treating mineral substances which yields a product of reduced and relatively uniform particle size.

Another object of the invention is the provision of a method for the treatment of mineral substances whereby the particle size is reduced so that the major portion thereof is less than 2 microns.

A further object of the invention is to provide a procedure in accordance with which a clay is treated with sonic energy with the result that discrete particles are reduced in size and modified to substantially spheroidal form, i.e. having substantial elimination of the sharp edges and projections found in the product naturally or present when it is crushed or otherwise treated by mechanical processes.

A still further object of the invention is to provide a method for the treatment of mineral substances, particularly a clay, as kaolin, which may be readily, economically and efficiently carried out to a desired extent.

An additional object of the invention is to provide a method for the treatment of a clay, either natural or calcined, with sonic energy under conditions such that particles thereof are reduced in size and modified in form.

A particular object of the invention is to provide a method and product resulting therefrom in which a calcined kaolin is treated with sonic energy under conditions such that a product is obtained having small relatively uniform particles of rounded form and possessing marked brightness, good color, and low impurity content.

Other objects of the invention will in part be obvious and will in part appear hereinafter.

The invention accordingly comprises the several steps, and the relation of one or more of such steps with respect to each of the others, and the composition possessing the features and properties, which are exemplified in the following detailed disclosure, and the scope of the invention will be indicated in the claims.

In the practice of the invention, a mineral substance in the form of discrete particles is subjected to the influence of sonic energy wheerby there is obtained a product in which particles are of relatively small size and spheroidal or rounded shape. Desirably, the mineral substance is treated while suspended in an aeroform fluid, as a current of air, and suitably as a 4% suspension therein, the aeroform fluid flowing at a rate from about 12 to about 44 c.f.m., specifically, at about 20 c.f.m.

Further, the sonic energy applied is of an intensity greater than 150 decibels, especially from about 155 to about 165 decibels, and under a frequency from about 0.5 to about 3.5 kc., particularly, from about 1.3 to about 1.8 kc. and, specifically, about 1.5 kc., and the pressure is from about 8.5 to about 8.7 p.s.i.g.

As mineral substances which may be treated in the foregoing manner, mention may be made of various clays, either natural or calcined, such as kaolin, and specifically, calcined kaolin, and also various hydrous aluminum silicates, shale, dolomite, calcite $CaCO_3$, gaylussite $CaCO_3.Na_2.CO_3.5H_2O$, glauberite $Na_2SO_4.CaSO_4$, anhydrite $CaSO_4$, gypsum $CaSO_4.2H_2O$, aragonite $CaCO_3$, barite $BaSO_4$, magnesite $MgCO_3$, talc, titanium dioxide $TiO_2$, lithopone, calcium sulfite $CaSO_3.\frac{1}{2}H_2O$, whiting precipitated calcium carbonate, diatomaceous earth, satin white, zinc sulfide, zinc oxide. Particles of the substances after treatment are of reduced size with a major portion of such particles being less than 2 microns.

Figure 2:
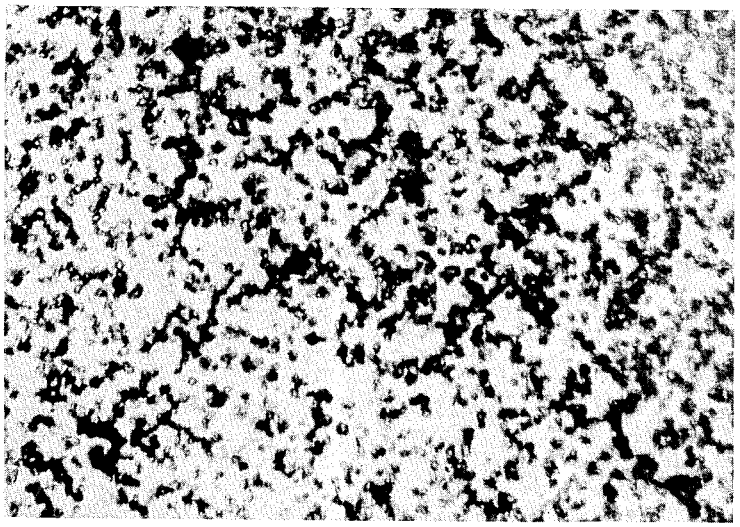

Moreover, there is a definite rounding of the particles to substantially spheroidal shape with additional characteristics being a high brightness, relatively uniform particle size, constant pH, good color, and low impurity content. The effect of the treatment with sonic energy is shown in the figures, which are photomicrographs at 1000 magnification, FIGURE 1 showing untreated particles of relatively large size, whereas FIGURE 2 shows treated particles of very much reduced size, and in which the major part are of less than 2 microns.

Moreover, at the 1000 magnification, each millimeter scaled on the print equals 1 micron actual diameter. Therefore, the 2 micron particles are 2 mm. in diameter. It will be observed that there is a marked rounding or spheroidizing of the particles, and that this pertains even to the most minute particles.

The treatment with sonic energy may be conducted in an apparatus, which is illustratively shown in FIGURE 3 of the accompanying drawing which carries appropriate legends, includes an air inlet pipe into which an orifice is inserted in order to measure the air flow. A feeder, suitably of screw-type, discharges the mineral substance, as kaolin, into the air inlet pipe just prior to its entering the sonic treating chamber. This chamber may consist of a plastic cylinder of an effective height between inlet and outlet of about 9 inches, and a diameter of about 12 inches.

The chamber may be equipped with a plastic base having a hole in the center through which a microphone is inserted. Further, the chamber is secured in a suitable manner to a sound generator, there being a small clearance between the chamber and the edge of the sound generator horn which provides an outlet for the generator exhaust air. A gas-tight diaphragm separates the top of the treating chamber from the generator exhaust.

The stream of air containing the particles leaves the treating chamber through an outlet placed close to the top, and passes to a cyclone separator which may be equipped with a 60 c.f.m. collection tube and a removable hopper. The air stream then may pass from the cyclone separator to a bag filter where the remaining particles are removed. The bag filter, in turn, is connected with the suction side of a blower or fan and the suction may be of the magnitude of about 20 inches of water.

As an illustrative embodiment of a manner in which the invention may be practiced, the following examples are presented:

*Example 1*

A kaolin was treated by suspending in an air stream in which the ratio of kaolin to air, expressed as grains per cubic foot, varied from 15.1 to 96.7, and the flow varied from about 12 to about 44 c.f.m. The sound intensity was from about 155 to about 165 decibels with a frequency of about 1.5 kc., and a rotor pressure from about 8.5 to about 8.7 p.s.i.g.

*Example 2*

A calcined kaolin was suspended in air as a 4% suspension and subjected to sonic energy, with a sound intensity from about 156 to about 160 decibels, a frequency of about 1.3 kc., and a rotor pressure of about 8.5 p.s.i.g. The frequencies chosen herein and in Example 1 are such that the substance is in a state of resonance.

The foregoing procedure leads to the preparation of a product as clay, specifically calcined kaolin, in which the particles are reduced in size and rounded in form. Further, the particles are distinctive in being less than 2 microns in diameter, and additionally characterized by being of a high brightness, relatively uniform size, constant pH, good color, and low impurity content. Thus no impurities are introduced by the treatment in contrast to grinding or other mechanical operation in which particles are often eroded from the mechanism and become admixed with the substance.

It was found in a series of clays treated with sonic energy in which the largest particles were 7, 7, 15, 10, and 8 microns, the percentage of particles under 2 microns was 80, 90, 75, 90 and 85 respectively.

Furthermore, the products resulting from the treatment are well adapted for and may be utilized in paper, especially dull coated. Further, a smoother sheet is obtained and due to the spheroidal shape the knives on the slitter and machines last longer by about three times with improvement in the life of printer's type by about 200%, rubber—natural and synthetic—with improvement in electrical properties due to elimination of voids, flexible plastics, tooth paste or powder, leather, textiles, silver polish, tiles, linoleums, paints with distinctive and marked enhancement of the finish, and buffing compounds.

This application is a continuation in part of my copending application Serial No. 239,963, filed August 2, 1951, and now abandoned.

Since certain changes in carrying out the above method and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for the treatment of clays which comprises subjecting the clay in the form of discrete particles suspended in an aeroform fluid to the influence of sonic energy of an intensity greater than 150 decibels, and a frequency from about 0.5 to about 3.5 kc., whereby particle size is reduced.

2. A method for the treatment of clays which comprises subjecting the clay in the form of discrete particles suspended in an aeroform fluid to the influence of sonic energy of an intensity greater than 150 decibels, and a frequency from about 1.3 to about 1.8 kc., whereby particle size is reduced.

3. A method for the treatment of calcined kaolin which comprises subjecting the calcined kaolin in the form of discrete particles suspended in an aeroform fluid to the influence of sonic energy of an intensity greater than 150 decibels, and a frequency from about 1.3 to about 1.8 kc., whereby particle size is reduced.

References Cited in the file of this patent

UNITED STATES PATENTS

| | | |
|---|---|---|
| 1,995,803 | Gilbert | Mar. 26, 1935 |
| 2,158,987 | Maloney | May 16, 1939 |
| 2,360,893 | Robinson | Oct. 24, 1944 |
| 2,386,337 | Moyer | Oct. 9, 1945 |
| 2,524,816 | Lyons | Oct. 10, 1950 |
| 2,613,877 | Hunrath | Oct. 14, 1952 |
| 2,628,785 | Fink | Feb. 17, 1953 |

FOREIGN PATENTS

| | | |
|---|---|---|
| 489,610 | Great Britain | July 25, 1938 |
| 1,010,117 | France | June 9, 1952 |